US007241926B2

United States Patent
Bohres et al.

(10) Patent No.: US 7,241,926 B2
(45) Date of Patent: Jul. 10, 2007

(54) METHOD FOR PRODUCING POLYETHER ALCOHOLS

(75) Inventors: Edward Bohres, Ludwigshafen (DE); Ulrich Müller, Neustadt (DE); Raimund Ruppel, Dresden (DE); Eva Baum, Schwarzheide (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 185 days.

(21) Appl. No.: 10/493,608

(22) PCT Filed: Nov. 8, 2002

(86) PCT No.: PCT/EP02/12492

§ 371 (c)(1),
(2), (4) Date: Apr. 23, 2004

(87) PCT Pub. No.: WO03/042280

PCT Pub. Date: May 23, 2003

(65) Prior Publication Data

US 2004/0249221 A1     Dec. 9, 2004

(30) Foreign Application Priority Data

Nov. 15, 2001   (DE) ................. 101 56 117

(51) Int. Cl.
*C07C 41/03*     (2006.01)
*B01J 27/26*     (2006.01)
(52) U.S. Cl. ............ 568/620; 568/618; 568/679; 502/175; 502/200; 502/150; 502/154; 502/155; 502/156; 502/172

(58) Field of Classification Search ............... 568/618, 568/620, 679; 502/175, 200, 150, 154, 155, 502/156, 172
See application file for complete search history.

(56) References Cited

U.S. PATENT DOCUMENTS

| | | | |
|---|---|---|---|
| 3,278,457 A | 10/1966 | Milgrom | |
| 3,278,458 A | 10/1966 | Belner | |
| 3,278,459 A | 10/1966 | Herold | |
| 3,427,256 A | 2/1969 | Milgrom | |
| 3,427,334 A * | 2/1969 | Belner | ........................ 556/31 |
| 5,712,216 A | 1/1998 | Le-Khac et al. | |
| 5,731,407 A | 3/1998 | Le-Khac et al. | |
| 6,627,575 B2 * | 9/2003 | Kim et al. | .................. 502/175 |
| 6,806,393 B2 * | 10/2004 | Grosch et al. | ............. 568/623 |
| 2004/0242937 A1 * | 12/2004 | Baum et al. | ................ 568/679 |

FOREIGN PATENT DOCUMENTS

| | | |
|---|---|---|
| DE | 198 40 846 A1 | 3/2000 |
| EP | 0 743 093 A1 | 11/1996 |
| EP | 1 053 787 A1 | 11/2000 |
| WO | WO 01/38420 A1 | 5/2001 |

OTHER PUBLICATIONS

Richard J. Lewis, Sr., Hawley's Condensed Chemical Dictionary, 1993, p. 1108.*

* cited by examiner

*Primary Examiner*—Rosalynd Keys
(74) *Attorney, Agent, or Firm*—Fernando A. Borrego

(57) ABSTRACT

A process for preparing polyether alcohols by addition of alkylene oxides onto H-functional starter substances in the presence of multimetal cyanide catalysts, wherein the multimetal cyanide catalysts are microporous and have a specific surface area of more than 100 $m^2/g$, determined by nitrogen adsorption at 77 K.

12 Claims, 1 Drawing Sheet

METHOD FOR PRODUCING POLYETHER ALCOHOLS

The present invention relates to a process for preparing polyether alcohols by addition of alkylene oxides onto H-functional starter substances using multimetal cyanide catalysts, frequently also referred to as DMC catalysts.

Polyether alcohols are important starting materials in the production of polyurethanes. They are usually prepared by catalytic addition of lower alkylene oxides, in particular ethylene oxide and/or propylene oxide, onto H-functional starter substances.

As catalysts, use is usually made of soluble basic metal hydroxides or salts, with potassium hydroxide having the greatest practical importance. A disadvantage of the use of potassium hydroxide as catalyst is, in particular, that formation of unsaturated by-products occurs in the preparation of high molecular weight polyether alcohols, and these reduce the functionality of the polyether alcohols and have a very adverse effect in the production of polyurethanes.

To reduce the content of unsaturated components in the polyether alcohols and to increase the reaction rate in the addition reaction of propylene oxide, it has been proposed that multimetal cyanide compounds, preferably double metal cyanide compounds, frequently also referred to as DMC catalysts, be used as catalysts. There is a large number of publications in which such compounds have been described. They are usually prepared by reacting solutions of metal salts, usually zinc chloride, with solutions of alkali metal or alkaline earth metal cyanometalates, e.g. potassium hexacyanocobaltate, or cyanometalic acids. Normally, a water-miscible component containing one or more heteroatoms is added to the resulting suspension immediately after the precipitation step. This component can be initially present in one or both starting solutions. The water-miscible, heteroatom-containing component is preferably an ether, polyether, alcohol, ketone or a mixture of at least two of the compounds mentioned. Such processes have been described frequently, for example in U.S. Pat. No. 3,278,457, U.S. Pat. No. 3,278,458, U.S. Pat. No. 3,278,459, U.S. Pat. No. 3,427,256.

Disadvantages which frequently arise in the use of the DMC catalysts are the long induction time and their sometimes unsatisfactory activity. As a result, it is often necessary to employ large amounts of DMC catalyst, which has an adverse effect on the economics of the process. If small amounts of catalyst are nevertheless used, disadvantages have to be accepted in the processing properties of the polyether alcohols.

To alleviate this deficiency, U.S. Pat. No. 5,712,216 and U.S. Pat. No. 5,731,407 propose using amorphous DMC catalysts which have, inter alia, a very low surface area. The surface area of these catalysts is below 30 m$^2$/g, preferably below 20 m$^2$/g. However, these catalysts, too, have not been able to overcome the disadvantages of the long induction time and the low activity.

It is an object of the present invention to provide DMC catalysts which, even when small amounts are used, display a high activity, make rapid commencement of the reaction possible and lead to polyether alcohols having good processing properties in further processing to produce polyurethanes, in particular flexible polyurethane foams.

We have found this object is achieved by means of microporous DMC catalysts, in particular those having a crystalline structure, which have a surface area of above 100 m$^2$/g, preferably above 200 m$^2$/g and particularly preferably above 450 m$^2$/g, which have a particularly high catalytic activity and make commencement of the reaction with virtually no induction period possible.

The present invention accordingly provides a process for preparing polyether alcohols by addition of alkylene oxides onto H-functional starter substances using DMC catalysts, wherein the DMC catalysts used are microporous and have a specific surface area of at least 100 m$^2$/g, determined by nitrogen adsorption at 77 K and calculated by the Langmuir method as described in "Pure & Appl. Chem., Vol. 57, No. 4, pp. 603–619, 1985" and "Gregg, S. J.; Sing, K. S. W.; Adsorption, Surface Area and Porosity, Academic Press, London 1982". For the purposes of the present invention, microporous materials are materials having pore diameters of <2 nm (Pure & Appl. Chem., Vol. 57, No. 4, pp. 603–619, 1985).

Figure 1:
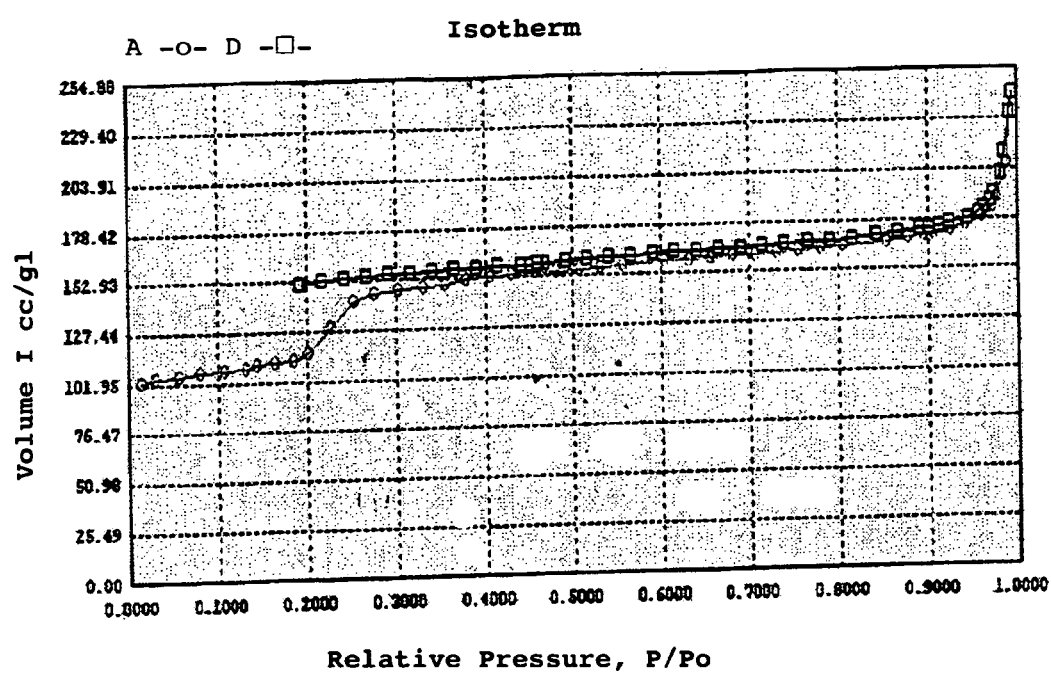
FIG. 1 is an adsorption curve illustrating hysteresis behavior between adsorption and desorption.

The catalysts suitable for the process of the present invention preferably have a surface area above 100 m$^2$/g, particularly preferably above 200 m$^2$/g and in particular above 450 m$^2$/g. The upper limit for the surface area is preferably 3 000 m$^2$/g. It is in principle also possible to use catalysts having a larger surface area for the process of the present invention, but such catalysts are difficult to prepare.

The determination of the surface area of the DMC catalysts for the purposes of the present invention is, as indicated above, carried out using nitrogen at 77 K with the aid of sorption isotherms (Autosorb AS-6 from Quantachrome) in accordance with the teachings of "Pure & Appl. Chem., Vol. 57, No. 4, pp. 603–619, 1985" and "Gregg, S. J.; Sing, K. S. W.; Adsorption, Surface Area and Porosity, Academic Press, London 1982". The quoted specific surface area is the value calculated in accordance with the Langmuir model (Gregg, S. J.; Sing, K. S. W.; Adsorption, Surface Area and Porosity, Academic Press, London 1982) on the assumption that a nitrogen molecule occupies an area of 0.162 nm$^2$. Before commencement of the measurement, the samples were activated at 200° C. in a high vacuum generated by means of a turbo molecular pump.

In a particularly preferred embodiment of the process of the present invention, the adsorption curve displays the hysteresis behavior between adsorption and desorption as shown in FIG. 1. In the relative pressure range from 0.001 to 0.2 p/p°, the pore volume determined using nitrogen at 77 K is from 0.05 to 0.25 ml/g, and that in the range >0.2 p/p° is from 0.1 to 0.5 ml/g, with the isotherm in the relative pressure range from 0.005 to 0.35 p/p° having a significant step. The pressure parameter p/p° is the ratio of the set pressure point p to the saturation pressure p° at the respective test temperature.

The multimetal cyanide catalysts of the present invention have the formula:

$$M^1_a[M^2(CN)_b(A)_c]_d \cdot fM^1_gX_n \cdot h(H_2O)eL \cdot kP \qquad (I),$$

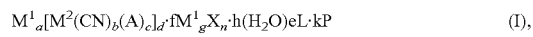

where $M^1$ is a metal ion selected from the group consisting of Zn2+, Fe2+, Co3+, Ni2+, Mn2+, Co2+, Sn2+, Pb2+, Mo4+, Mo6+, Al3+, V4+, V5+, Sr2+, W4+, W6+, Cr2+, Cr3+, Cd2+, La3+, Ce3+, Ce4+, Eu3+, Mg2+, Ti3+, Ti4+, Ag+, Rh1+, Ru2+, Ru3+, Pd2+, $M^2$ is a metal ion selected from the group consisting of Fe2+, Fe3+, Co2+, Co3+, Mn2+, Mn3+, V4+, V5+, Cr2+, Cr3+, Rh3+, Ru2+, Ir3+ and $M^1$ and $M^2$ are different,

A is an anion selected from the group consisting of halide, hydroxide, sulfate, carbonate, cyanide, thiocyanate, isocyanate, cyanate, carboxylate, oxalate and nitrate, X is an anion selected from the group consisting of halide, hydroxide, sulfate, carbonate, cyanide, thiocyanate, isocyanate, cyanate, carboxylate, oxalate and nitrate, L is a water-miscible ligand selected from the group consisting of alcohols, aldehydes, ketones, ethers, polyethers, esters, polyesters, polycarbonate, ureas, amides, nitriles and sulfides and mixtures thereof, P is an organic additive selected from the group consisting of polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylamide-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkylenimines, maleic acid and maleic anhydride copolymers, hydroxyethylcellulose, polyacetates, ionic surface-active and interface-active compounds, bile acids and their salts, esters and amides, carboxylic esters of polyhydric alcohols and glycosides, and a, b, d, g and n are integers or fractions greater than zero, c, f, e, h and k are integers or fractions greater than or equal to zero, with at least one number being different from zero, where a, b, c, and d, and also g and n are chosen so that the compound is electrically neutral.

These catalysts can be crystalline or amorphous. When k is zero, crystalline double metal cyanide compounds are preferred. When k is greater than zero, both crystalline, partially crystalline and substantially amorphous catalysts are preferred.

There are various preferred embodiments of the modified catalysts.

In a preferred embodiment, the catalysts of the formula (I) have a value of k which is greater than zero.

The preferred catalysts then comprises:

at least one multimetal cyanide compound at least one organic ligand at least one organic additive P.

In another preferred embodiment, k is zero or has a value so that the content of the component P is not more than 4% by weight, based on the compound of the formula (I). If desired, e is also zero and X is exclusively carboxylate, preferably formate, acetate and propionate.

In another, particularly preferred embodiment of the DMC catalysts, f is greater than zero, preferably in the range from zero to 6. In this embodiment in which a metal salt is present in the DMC catalyst, the catalyst has a structure which displays a particularly high catalytic activity.

In this embodiment, the double metal cyanide catalysts preferably have a crystalline structure.

Double metal cyanide catalysts which are crystalline and have a platelet-like morphology, as described in WO 00/74845, are advantageous.

The catalysts of the present invention are prepared by combining a metal salt solution with a cyanometalate solution, with the solutions optionally being able to contain an organic ligand L and an organic additive P. The organic ligand and optionally the organic additive are subsequently added.

In a preferred embodiment of the preparation of the catalyst, an inactive multimetal cyanide phase is prepared first and this is subsequently converted into an active multimetal cyanide phase by recrystallization, for example by means of a change in the pH of the precipitation solution, by means of a temperature increase or by addition of further starting solution, as described in WO 01/64772.

In another preferred embodiment of the catalysts, f, e and k are different from zero. In this case, the DMC catalysts contain a water-miscible organic ligand, generally in an amount of from 0.5 to 30% by weight, and an organic additive, for example a polyether alcohol, generally in an amount of from 5 to 80% by weight, as described, for example, in WO 98/16310.

An important factor in achieving the structure of the multimetal cyanide catalysts is the energy input during their preparation. The multimetal cyanide catalysts are preferably prepared with intensive stirring, for example at 24 000 rpm using a Turrax® stirrer, as described, for example, in U.S. Pat. No. 5,470,813.

The precipitated catalyst can be isolated by filtration or centrifugation and be dried under reduced pressure. The dried catalyst is then milled, for example as described in U.S. Pat. No. 3,829,505 and U.S. Pat. No. 5,714,639. However, the catalyst can also be dried by spray drying or freeze drying, as described, for example, in U.S. Pat. No. 5,998,672.

It is generally difficult to predict the surface area of a multimetal cyanide catalyst. For this reason, the surface area of the multimetal cyanide catalysts can be determined after their preparation and the suitable catalysts can be chosen for use in the process of the present invention.

It is naturally also possible and preferred to control the preparation of the catalysts so that catalysts having the desired surface area are obtained with a high degree of probability, in order to reduce the incidence of unsatisfactory batches as much as possible.

For this purpose, it is advantageous to carry out the preparation of the catalysts in the presence of at least one surface-active compound, in addition to the measures described above. Suitable surface-active compounds are, for example, alkylene oxide block polymers, in particular bifunctional ethylene oxide-propylene oxide copolymers, or alkoxylated fatty acids.

A further advantageous variant of the preparation of multimetal cyanide catalysts having the surface area according to the present invention comprises using a cyanometalic acid as cyanometalate compound. This makes it possible to carry out the preparation so that there is no automatic formation of a salt which has an unfavorable effect on the surface area of the multimetal cyanide catalysts.

To prepare the polyether alcohols, the DMC catalyst can be used in the form of powder or in the form of a suspension. Suitable suspensions are described, for example, in WO 00/74843.

The preparation according to the present invention of polyether alcohols is carried out, as indicated, by addition of alkylene oxides onto H-functional starter substances in the presence of the catalysts described.

As alkylene oxides, it is possible to use all known alkylene oxides, for example ethylene oxide, propylene oxide, butylene oxide, styrene oxide. Particular preference is given to using ethylene oxide, propylene oxide and mixtures of the compounds mentioned as alkylene oxides.

Starter substances used are H-functional compounds. In particular, alcohols having a functionality of from 1 to 8, preferably from 2 to 8, are used. To prepare polyether alcohols which are used for flexible polyurethane foams, starter substances used are, in particular, alcohols having a functionality of from 2 to 4, in particular 2 or 3. Examples are ethylene glycol, propylene glycol, glycerol, trimethylolpropane, pentaerythritol. In the addition reaction of the alkylene oxides in the presence of DMC catalysts, it is advantageous to use, either together with or in place of the alcohols mentioned, the reaction products of these with alkylene oxides, in particular propylene oxide. Such compounds preferably have a molar mass up to 500 g/mol. The addition reaction of the alkylene oxides in the preparation of these reaction products can be carried out using any catalysts, for example basic catalysts. The polyether alcohols for the production of flexible polyurethane foams usually have a hydroxyl number in the range from 20 to 100 mg KOH/g.

The addition reaction of the alkylene oxides in the preparation of the polyether alcohols used for the process of the present invention can be carried out by known methods. Thus, it is possible for the polyether alcohols to contain only one alkylene oxide. When a plurality of alkylene oxides is used, blockwise addition in which the alkylene oxides are added on individually in succession, or random addition in which the alkylene oxides are introduced together is possible. It is also possible to incorporate both blocks and random sections into the polyether chain in the preparation of the polyether alcohols.

In a particular embodiment of the addition reaction, the ratio of the alkylene oxides is altered during the course of the addition reaction.

To produce flexible polyurethane slabstock foams, preference is given to using polyether alcohols having a high content of secondary hydroxyl groups and a content of ethylene oxide units in the polyether chain of not more than 30% by weight, based on the weight of the polyether alcohol. These polyether alcohols preferably have a propylene oxide block at the end of the chain. Molded flexible polyurethane foams are produced using, in particular, polyether alcohols having a high content of primary hydroxyl groups and an ethylene oxide end block in an amount of <20% by weight, based on the weight of the polyether alcohol.

The addition reaction of the alkylene oxides is carried out under the customary conditions, at from 60 to 180° C., preferably from 90 to 140° C., in particular from 100 to 130° C., and pressures in the range from 0 to 20 bar, preferably from 0 to 10 bar and in particular from 0 to 5 bar. The mixture of starter substance and DMC catalyst can, according to the teachings of WO 98/52689, be pretreated by stripping prior to commencement of the alkoxylation.

An advantageous embodiment of the process of the present invention comprises metering in the starter and the alkylene oxides together during at least part of the reaction, as described, for example, in WO 97/29146 or WO 98/03571. In this embodiment of the process of the present invention, it is possible, for example, to place part of the starter substance together with the catalyst in a reaction vessel and, after the reaction has started, to feed in further starter and alkylene oxide continuously until the desired chain length of the polyether alcohol has been reached. It is also possible to feed in starter continuously only at the beginning of the addition reaction of the alkylene oxides and then to introduce only alkylene oxides in an customary fashion until the desired chain length of the polyether alcohol has been reached.

Furthermore, the process can also be carried out by metering starter, alkylene oxides and, if desired, catalyst continuously into a continuous reactor and continuously taking off the finished polyether alcohol.

The advantage of the procedure described is, firstly, that the problems at the start of the reaction, in particular the delayed commencement of the reaction, are avoided. Secondly, the molecular weight distribution of such polyether alcohols is usually narrower than that of other polyether alcohols prepared by means of DMC catalysts.

After the addition reaction of the alkylene oxides is complete, the polyether alcohol is worked up according to customary methods by removing unreacted alkylene oxides and volatile constituents, usually by distillation, steam or gas stripping and/or other deodorization methods. If necessary, a filtration can also be carried out.

The use of the microporous catalysts of the present invention suprisingly makes it possible to prepare polyetherols having very good properties using a low catalyst concentration. In addition, the induction time at the beginning of the reaction can be significantly reduced.

The invention is illustrated by the following examples.

EXAMPLES

Preparation of DMC Catalysts

Example 1 (BK-024)

370 kg of aqueous hexacyanocobaltic acid (cobalt content: 9 g/l) were placed in a stirred vessel having a volume of 800 l and equipped with a disc stirrer, an immersed tube for introducing reactants, a pH electrode, a conductivity measurement cell and a scattered light probe and were heated to 50° C. while stirring. While stirring (stirrer power: 1 W/l), 209.5 kg of aqueous zinc acetate dihydrate solution (zinc content: 2.7% by weight), which had likewise been brought to 50° C., were then fed in over a period of 45 minutes.

7.9 kg of a block polymer of ethylene oxide and propylene oxide (Pluronic® PE 6200 (BASF AG)) and 10.7 kg of water were subsequently added while stirring. The suspension was then heated to 55° C. 67.5 kg of aqueous zinc acetate dihydrate solution (zinc content: 2.7% by weight) were then metered in at 55° C. over a period of 20 minutes.

The suspension was stirred at 55° C. until the pH had dropped from 4.1 to 3.7 and remained constant. The suspension obtained in this way was subsequently filtered and the solid was washed on the filter with 6 times the cake volume of water.

The moist filter cake was dried overnight at 110° C. under reduced pressure. The specific surface area of the dried powder was determined using nitrogen at 77 K with the aid of sorption isotherms (Autosorb AS-6 from Quantachrome) in accordance with the teachings of "Pure & Appl. Chem., Vol. 57, No. 4, pp. 603–619, 1985", and "Gregg, S. J.; Sing, K. S. W.; Adsorption, Surface Area and Porosity, Academic Press, London 1982".

Specific surface area: 375 m$^2$/g

Elemental Analysis:

Co: 25.6% by weight; Zn: 11.9% by weight

Comparative Example 1

In a glass beaker, 8.0 kg of potassium hexacyanocobaltate (III) were dissolved in 150 g of water. A solution of 20.0 g of zinc(II) chloride in 30 g of water was added thereto. The mixture was stirred intensively by means of a Turrax from Janke & Kunkel. A solution of 100 ml of tert-butanol in 100 ml of water was then added slowly. After the addition, the mixture was stirred for a further 10 minutes and centrifuged. The solid was subsequently resuspended in 250 ml of a 70:30 mixture of tert-butanol/water, stirred by means of the Turrax for 10 minutes and centrifuged down. The precipitate was subsequently resuspended in 250 ml of tert-butanol, stirred by means of the Turrax and centrifuged down. Finally, the catalyst was dried at 50° C. under reduced pressure for about 16 hours. This gave 19.3 g of a white powder. The specific surface area of the dried powder was determined as described in example 1.

Elemental Analysis:
  Co: 5.8% by weight, Zn: 28% by weight
  Specific surface area: 59.8 $m^2/g$

Comparative Example 2

100 g of zinc(II) chloride, 66.7 ml of tert-butanol/N-methyl(2-pyrrolidone) mixture (1:1) and 466.7 g of water were placed in a glass beaker. A solution comprising 10 g of potassium hexacyanocobaltate(III), 26.6 g of tert-butanol/N-methyl(2-pyrrolidone) mixture (1:1) and 133.3 g of water was added thereto over a period of 35 minutes. The mixture was stirred by means of a Turrax from Janke & Kunkel at 20% power. The Turrax power was subsequently increased to 40% and stirring was continued for another 10 minutes. A solution of 10.7 g of polypropylene glycol having a molecular weight $M_w$ of 900 g/mol (Pluriol® P 900 from BASF) and 2.0 ml of tetrahydrofuran in 66.7 g of water was then added, the mixture was stirred by means of a magnetic stirrer for three minutes and the solid was subsequently filtered off. The precipitate was resuspended in a solution of 173 ml of tert-butanol in 73 ml of water and stirred for ten minutes by means of the Turrax (40% power). A solution of 2.6 g of polypropylene glycol having a molecular weight $M_w$ of 900 (Pluriol® P 900 from BASF) in 2.6 ml of tetrahydrofuran was then added, the mixture was stirred by means of a magnetic stirrer for 3 minutes and the solid was subsequently filtered off. The precipitate was then suspended in 246.6 ml of tert-butanol and stirred by means of the Turrax (40% power) before 2.6 g of THF and 1.3 g of polypropylene glycol (Mw=900 g/mol) were added. Finally, the catalyst was filtered off and dried at 50° C. under reduced pressure. This gave 27.0 g of a white powder. The specific surface area of the dried powder was determined as described in example 1.

Elemental Analysis:
  % Co: 5.6; % Zn: 20.0%;
  Specific surface area: 17.6 $m^2/g$

Example 2

1 000 g of aqueous hexacyanocobaltic acid (Co content: 9.0 g/l) were placed in a 2 liter precipitation apparatus equipped with an oblique blade turbine, a pH electrode, a conductivity measurement cell, a scattered light probe and an immersed inlet tube for the precipitation agent and were heated to 50° C. 582.0 g of aqueous zinc acetate dihydrate solution (zinc content: 2.6% by weight), which had likewise been brought to 50° C., were subsequently fed in over a period of 45 minutes while stirring (stirrer power: 1 W/l). 21 g of a block polymer of ethylene oxide and propylene oxide (Pluronic® PE 6200-BASF AG) in 30 g of water were then added while stirring. The suspension was then heated to 55° C. 200 g of aqueous zinc acetate dihydrate solution (zinc content: 2.6% by weight) together with 3.26% by weight of acetonitrile were then metered in at 55° C. over a period of 10 minutes.

The suspension was stirred until the pH of 4.26 had dropped to 3.45 and remained constant. The suspension obtained in this way was subsequently filtered with suction, the solid was resuspended, filtered off with suction and washed on the filter with 6 times the cake volume of water.

The moist filter cake was dried overnight at 110° C. under reduced pressure.

The specific surface area of the dried powder was measured using nitrogen at 77 K with the aid of sorption isotherms (Autosorb® AS-6 from Quantachrome) in accordance with the teachings of "Pure & Appl. Chem., Vol. 57, No. 4, pp. 603–619, 1985" and "Gregg, S. J.; Sing, K. S. W.; Adsorption, Surface Area and Porosity, Academic Press, London 1982".

The resulting DMC catalyst had a specific surface area of 302 $m^2/g$, a cobalt content of 13.3% by weight and a zinc content of 29.8% by weight.

Example 3

1 000 g of aqueous hexacyanocobaltic acid (Co content: 9.0 g/l) and 21 g of surface-active agent (Pluronic® PE 6200 from BASF AG) in 30 g of water were placed in a precipitation apparatus as described in example 2 and heated to 60° C. 787.3 g of aqueous zinc acetate dihydrate solution (zinc content: 2.6% by weight), which had likewise been brought to 60° C., were subsequently fed in over a period of 78.7 minutes while stirring (stirrer power: 1 W/l). The pH in the apparatus went from 1.12 (hexacyanocobaltic acid/PE 6200) through a maximum of 4.2 to finish at 3.7, where it remained constant.

The suspension obtained in this way was subsequently filtered with suction, the solid was resuspended, filtered off with suction and washed on the filter with 6 times the cake volume of water.

The moist filter cake was dried overnight at 110° C. under reduced pressure.

The specific surface area of the dried powder was measured using nitrogen at 77 K with the aid of sorption isotherms (Autosorb® AS-6 from Quantachrome) in accordance with the teachings of "Pure & Appl. Chem., Vol. 57, No. 4, pp. 603–619, 1985" and "Gregg, S. J.; Sing, K. S. W.; Adsorption, Surface Area and Porosity, Academic Press, London 1982".

The resulting DMC catalyst had a specific surface area of 476 $m^2/g$, a cobalt content of 13.7% by weight and a zinc content of 30.5% by weight.

Example 4

1 000 g of aqueous potassium hexacyanocobaltate solution (Co content: 9.0 g/l) and 22.0 g of Pluronic® PE 6200 were placed in a precipitation apparatus as described in example 2 and heated to 60° C. 787.3 g of aqueous zinc acetate dihydrate solution (zinc content: 2.6% by weight), which had likewise been brought to 60° C., were subsequently fed in over a period of 98.4 minutes while stirring (stirrer power: 1 W/l). The pH was 10.25 at the beginning of this single-stage precipitation and was constant at 6.9 at the end.

The suspension obtained in this way was subsequently filtered with suction, the solid was resuspended, filtered off with suction and washed on the filter with 6 times the cake volume of water.

The moist filter cake was dried overnight at 110° C. under reduced pressure. The specific surface area of the dried powder was measured using nitrogen at 77 K with the aid of sorption isotherms (Autosorb® AS-6 from Quantachrome) in accordance with the teachings of "Pure & Appl. Chem., Vol. 57, No. 4, pp. 603–619, 1985", and "Gregg, S. J.; Sing, K. S. W.; Adsorption, Surface Area and Porosity, Academic Press, London 1982".

The resulting DMC catalyst had a specific surface area of 254 m²/g, a cobalt content of 13.6% by weight and a zinc content of 31% by weight.

Example 5

1 000 g of aqueous hexacyanocobaltic acid (Co content: 9.0 g/l) and 12.0 g of Pluronic® PE 6200 were placed in a precipitation apparatus as described in example 2 and heated to 50° C. 594.6 g of aqueous zinc acetate dihydrate solution (zinc content: 2.6% by weight) containing 1.2% by weight of Pluronic® PE 6200, which had likewise been brought to 50° C., were subsequently fed in over a period of 45.7 minutes while stirring (stirrer power: 1 W/l). The suspension was then heated to 55° C. 202.0 g of aqueous zinc acetate dihydrate solution (zinc content: 2.6% by weight) containing 1.2% by weight of Pluronic® PE 6200 were then metered in at 55° C. over a period of 8 minutes. The suspension was stirred until the pH had dropped from 3.94 to 3.46 and remained constant.

The suspension obtained in this way was subsequently filtered with suction, the solid was resuspended, filtered off with suction and washed on the filter with 6 times the cake volume of water.

The moist filter cake was dried overnight at 110° C. under reduced pressure. The specific surface area of the dried powder was measured using nitrogen at 77 K with the aid of sorption isotherms (Autosorb® AS-6 from Quantachrome) in accordance with the teachings of "Pure & Appl. Chem., Vol. 57, No. 4, pp. 603–619, 1985", and "Gregg, S. J.; Sing, K. S. W.; Adsorption, Surface Area and Porosity, Academic Press, London 1982". The resulting DMC catalyst had a specific surface area of 323 m²/g, a cobalt content of 14.2% by weight and a zinc content of 32% by weight.

Catalytic Activity Tests

General Experimental Description:

6.2 kg of a propoxylate of glycerol and ethylene glycol having a hydroxyl number of 152 mg KOH/g were placed in a pressure-rated 20 l stirred tank reactor, the amount reported in table 1 of the DMC catalyst to be tested was added and the mixture was mixed well by means of an Ultra-Turrax. After the reactor had been evacuated and made inert by means of nitrogen, it was heated to the synthesis temperature of 120° C. and the introduction of 13.7 kg of a mixture of propylene oxide/ethylene oxide in a weight ratio of about 5:1 was commenced. The introduction was interrupted if a large pressure increase indicated that activation of the DMC catalyst and commencement of the polymerization had not yet occurred. A subsequent rapid decrease in the pressure was taken as an indication that the catalyst had been activated and the introduction was continued in this case. After the total amount of alkylene oxide had been added, the mixture was stirred for an after-reaction time of 15 minutes, the contents of the reactor were subsequently evacuated to remove residual alkylene oxide, the finished polyol was blanketed with nitrogen and drained off.

TABLE 1

Experimental results and product analyses

| DMC | Concentration ppm | Activation time min | OHN mg KOH/g | Viscosity at 25° C. mPas | Unsaturated constituents meq/g |
|---|---|---|---|---|---|
| E 1 | 150 | 10 | 47.3 | 584 | 0.010 |
| E 1 | 100 | 7 | 47.1 | 599 | 0.008 |
| E 2 | 100 | 13 | 49.6 | 552 | 0.006 |
| E 3 | 100 | 15 | 48.7 | 573 | 0.006 |
| E 4 | 100 | 16 | 51.0 | 640 | 0.007 |
| E 5 | 100 | 17 | 49.5 | 580 | 0.006 |
| C 1 | 150 | —* | —* | —* | —* |
| C 2 | 150 | —* | —* | —* | —* |
| C 2 | 300 | 52 | 50.4 | 674 | 0.022 |

*no reaction
E—example
C—comparative example

In contrast to the catalysts from the comparative examples, the catalysts of the present invention display a very short activation phase and make alkoxylation possible even when used in significantly smaller amounts. The products obtained have a lower viscosity and a lower content of unsaturated constituents than do products obtained using a significantly higher amount of comparative catalyst, which indicates a significantly higher activity and a lower level of secondary reactions.

We claim:

1. A process for preparing polyether alcohols by addition of alkylene oxides onto H-functional starter substances in the presence of multimetal cyanide catalysts, wherein the multimetal cyanide catalysts are microporous and have a specific surface area of more than 100 m²/g, determined by nitrogen adsorption at 77 K.

2. A process as claimed in claim 1, wherein the multimetal cyanide catalysts have a specific surface area greater than 200 m²/g.

3. A process as claimed in claim 1, wherein the multimetal cyanide catalysts have a specific surface area greater than 450 m²/g.

4. A process as claimed in claim 1, wherein the multimetal cyanide catalysts have a specific surface area of from 100 to 3000 m²/g.

5. A process as claimed in claim 1, wherein the multimetal cyanide catalysts have the formula (I)

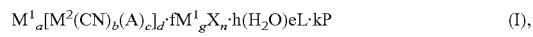

$$M^1_a[M^2(CN)_b(A)_c]_d \cdot fM^1_gX_n \cdot h(H_2O)eL \cdot kP \qquad (I),$$

where $M^1$ is a metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $La^{3+}$, $Ce^{3+}$, $Ce^{4+}$, $Eu^{3+}$, $Mg^{2+}$, $Ti^{3+}$, $Ti^{4+}$, $Ag^+$, $Rh^{1+}$, $Ru^{2+}$, $Ru^{3+}$, $Pd^{2+}$, and a, b, d, g and n are integers or fractions greater than zero, c, f, e, h and k are integers or fractions greater than or equal to zero, with at least one number being different from zero, where a, b, c, and d, and also g and n are chosen so that the compound is electrically neutral.

6. A process as claimed in claim 5, wherein, in the formula (I)
   $M^1$ is $Zn^{2+}$, $Fe^{2+}$, $Co^{3+}$, $Ni^{2+}$, $La^{3+}$, $Cr^{2+}$, $Cr^{3+}$, and
   $M^2$ is $Fe^{2+}$, $Fe^{3+}$, $Co^{2+}$, $Co^{3+}$, $Cr^{2+}$, $Cr^{3+}$, $Mn^{2+}$, $Mn^{3+}$, $Ir^{3+}$.

7. A multimetal cyanide compound of the formula (I)

$$M^1_a[M^2(CN)_b(A)_c]_d \cdot fM^1_g X_n \cdot h(H_2O)eL \cdot kP \qquad (I),$$

where
   $M^1$ is a metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $La^{3+}$, $Ce^{3+}$, $Ce^{4+}$, $Eu^{3+}$, $Mg^{2+}$, $Ti^{3+}$, $Ti^{4+}$, $Ag^+$, $Rh^{1+}$, $Ru^{2+}$, $Ru^{3+}$, $Pd^{2+}$,
   $M^2$ is a metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$, $Ir^{3+}$,
   and $M^1$ and $M^2$ are different,
   A is an anion selected from the group consisting of halide, hydroxide, sulfate, carbonate, cyanide, thiocyanate, isocyanate, cyanate, carboxylate, oxalate and nitrate, which is microporous and has a specific surface area of more than 100 m²/g, determined by nitrogen adsorption at 77 K.

8. A multimetal cyanide compound as claimed in claim 7, having a specific surface area greater than 200 m²/g.

9. A multimetal cyanide compound as claimed in claim 7, having a specific surface area greater than 450 m²/g.

10. A multimetal cyanide compound as claimed in claim 7, having a specific surface area of from 100 to 3000 m²/g.

11. A process as claimed in claim 1, wherein the multimetal cyanide catalysts have a specific surface area of from 200 to 3000 m²/g.

12. A multimetal cyanide compound as claimed in claim 7, having a specific surface area of from 200 to 3000 m²/g.

* * * * *